United States Patent
Spencer et al.

(10) Patent No.: US 7,646,748 B2
(45) Date of Patent: *Jan. 12, 2010

(54) POWER SAVING IN COMMUNICATION TERMINALS

(75) Inventors: Paul S. Spencer, Bet Shemesh (IL); Ronen Mayrench, Raanana (IL); Doron Rainish, Raanana (IL)

(73) Assignee: Marvell International, Ltd., Hamilton (BM)

( * ) Notice: Subject to any disclaimer, the term of this patent is extended or adjusted under 35 U.S.C. 154(b) by 47 days.

This patent is subject to a terminal disclaimer.

(21) Appl. No.: 12/010,624

(22) Filed: Jan. 28, 2008

(65) Prior Publication Data
US 2008/0130544 A1    Jun. 5, 2008

Related U.S. Application Data

(63) Continuation of application No. 09/962,424, filed on Sep. 25, 2001, now Pat. No. 7,339,910.

(51) Int. Cl.
*H04Q 7/00* (2006.01)
(52) U.S. Cl. .................... 370/332; 370/349
(58) Field of Classification Search ............ 370/310, 370/311, 312, 214, 317, 326, 332, 336, 349, 370/337, 320, 321, 314, 335, 342, 458, 313; 455/403, 407, 425; 714/756, 758
See application file for complete search history.

(56) References Cited

U.S. PATENT DOCUMENTS

| | | | |
|---|---|---|---|
| 5,845,204 A * | 12/1998 | Chapman et al. | 455/343.1 |
| 5,978,366 A | 11/1999 | Massingill et al. | |
| 5,991,635 A * | 11/1999 | Dent et al. | 455/517 |
| 6,072,987 A | 6/2000 | Willey | |
| 6,263,200 B1 | 7/2001 | Fujimoto | |
| 7,339,910 B2 * | 3/2008 | Spencer et al. | 370/332 |

FOREIGN PATENT DOCUMENTS

| | | |
|---|---|---|
| EP | 1 430 609 | 5/2006 |
| WO | WO 99/25051 | 5/1999 |
| WO | WO 01/18980 | 3/2001 |

* cited by examiner

*Primary Examiner*—Brenda Pham

(57) ABSTRACT

A communications terminal using interleaving may be awakened at certain times. The paging message determines whether the terminal will remain awake or it can return to sleep. The amount of time that the communications terminal is awakened may be reduced by determining whether it is necessary to demodulate all of the available time slots. In many cases, it may be possible, based on the environment in which terminal finds itself and the quality of the signals it receives, to obtain the necessary information without demodulating symbols from all the time slots in which symbols of the message are transmitted. As a result the period to receive the paging message may be reduced and the power consumption may likewise be reduced.

20 Claims, 4 Drawing Sheets

POWER SAVING IN COMMUNICATION TERMINALS

INCORPORATION BY REFERENCE

This application is a Continuation of application Ser. No. 09/962,424, "Power Saving in Communication Terminals" filed on Sep. 25, 2001. The disclosure of the prior application is incorporated herein by reference in its entirety.

BACKGROUND

The present invention relates to communication terminals such as cellular phones and pagers and in particular to methods for receiving and decoding messages by communication terminals.

Messages transmitted to cellular phones are encoded in order to reduce the chance that noise will corrupt the message. The messages comprise a plurality of bits, which are either '0' or '1'. The encoding of the message usually includes adding redundancy (i.e., making the encoded message longer than the original message), introducing symbol dependency (i.e., making the value of each symbol in the encoded message a function of a plurality of bits in the original message) and interleaving the message (i.e., mixing the order of the symbols in the encoded message).

Normally, each symbol in the received message is represented in the receiver, before decoding, by a word, which represents the chance that the symbol is a logical '1'. A high positive value of the word means that the symbol is a logical '1' with high confidence, while a negative value with a high absolute value means the symbol is a logical '0' with high confidence. A word with a zero value means that the symbol is a '0' or '1' with equal probability. This representation is referred to herein as soft data.

The decoding of the message is usually performed by finding an original message, which would result in the received encoded message with the highest probability. Due to the interleaving and the interdependence of the symbols of the encoded message, the decoding process does not usually begin before the entire message, or an entire frame of a predetermined length, is received. If the message were not interleaved, some decoding schemes would allow the decoding to begin before the entire message was received and end when the entire message is received. However, such schemes usually have a reduced performance, i.e., a higher rate of failure in correctly decoding the message, in particular in fading channels as often encountered in practice.

The messages usually include an error detection code, which is used to determine whether the message was properly decoded. One such code is the cyclic redundancy code (CRC).

Most cellular phones operate on rechargeable batteries. Some cellular systems reduce the rate at which the cellular phones consume battery power by having the phones operate in an idle mode when they are open for receiving calls but are not transmitting or receiving data. Generally, in the idle mode, the cellular phones deactivate most of their components to reduce their current consumption. Periodically, for example, once every two seconds, the cellular phones activate all their components, for a short wake up period during the idle mode. A base station of the system sends a broadcast or paging message to the cellular phones on a paging channel, notifying them to remain in the idle mode or to change to a reception mode, for example in order to receive an incoming call.

The wake up period of a cellular phone comprises a warm-up period, a reception period, a decoding period and a shut down period. In the wake up period the cellular phone activates all of its components in order to receive the message. If the message tells the cellular phone to remain in the idle mode, the cellular phone shuts down most of its components during the shut down period. Any reduction in the length of the wake up period results in an increase in the time a cellular phone may be used without recharging or replacing its battery.

Thus, there is a need for better ways to limit the amount of power consumption during the receipt of an interleaved paging message.

DETAILED DESCRIPTION OF EMBODIMENTS

Figure 1:
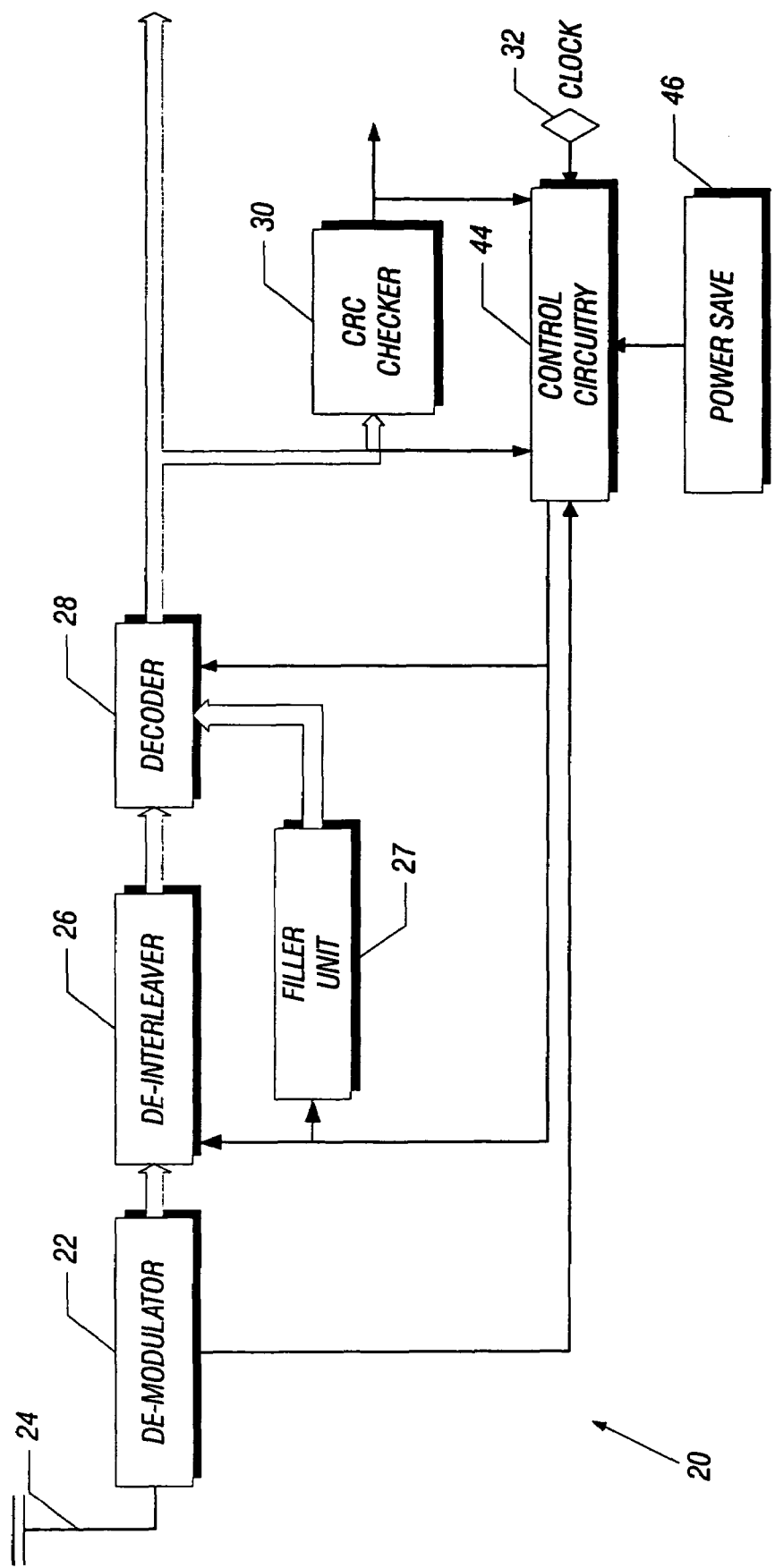
FIG. 1 is a simplified schematic illustration of a receiver, in accordance with one embodiment of the present invention.

Referring to FIG. 1, a receiver 20 comprises a de-modulator 22 that receives frames of transmitted messages via an antenna 24, and a de-interleaver 26 that stores an incoming frame. A decoder 28 decodes the incoming frames from the de-interleaver 26. After accumulating an entire message, which may include a plurality of frames, a single frame or less than a single frame, a CRC checker 30 checks the decoded message from the decoder 28 to determine whether the decoding was successful.

The receiver 20 also includes control circuitry 44, implemented for example by a digital signal processor (DSP), with appropriate software, that instructs the decoder 28 when to begin decoding a received frame. In order to save time, at least some of the frames received by receiver 20 may be decoded before the de-modulator 22 receives the entire frame, and the decoding may be performed without received values for at least some of the symbols of the frame. Further, the decoding may finish before the entire frame is received in one embodiment.

The control circuitry 44 may indicate which data to pass to the decoder 28 from the de-interleaver 26 for decoding. The control circuitry 44 may determine when to perform decoding based on an input from a clock 32.

The components of receiver 20 shown in FIG. 1 may be implemented by a plurality of sub-components or may be part of a single physical component, which includes other components. For example, in some embodiments of the invention, the filler unit 27 is an integral part of decoder 28 and/or of de-interleaver 26.

In the idle mode, the receiver 20 wakes up periodically, at predetermined times, in order to receive a control message from a base station. The control message informs the receiver 20 whether the receiver 20 is to receive an incoming message or return to sleep. The control message is typically shorter than the length of a single frame and is included within a single frame. The handling of the paging messages is responsible for most of the power consumption of receiver 20 during the idle mode. Thus, it may be advantageous in some embodiments to reduce the average length of the period when the receiver 20 experiences increased idle mode power consumption.

When a message from the base station to receiver 20 is due, clock 32, or a different clock controlling the receiver 20, wakes up the receiver 20. The de-modulator 22 begins to receive a frame and store it in the de-interleaver 26.

In one embodiment of the present invention, the decoder 28 decodes convolutional codes with a Viterbi style decoder, as described, for example, in chapter 6.2 of "Error-Correction Coding for Digital Communications," by G. C. Clark and J. Bibb Cain, Plenum Press, March 1988 and in Forney, G. D., Jr. (1972), "Maximum-Likelihood Sequence Estimation of Digital Sequences in the Presence of Intersymbol Interference," IEEE Trans. Inform. Theory, Vol. IT-18, pp. 363-378.

On the transmission side from the base station, for example, a block may be transmitted over four time slots. In one embodiment of the present invention, a Global System for Mobile Communications (GSM) protocol may be utilized. See GSM Specification TS 101 220 (2000-05-26) Version 8.00 "Digital Cellular Telecommunications System (Phase 2+)" available from the European Telecommunications Standards Institute, 06921 Sophia Antipolis, France. In such an embodiment, the paging information may comprise 184 bits, a check sum may comprise 40 bits, and four zeros may comprise 4 bits, making a message of 228 bits used for convolutional coding. In such an embodiment, at the transmitter, the 228 bits are passed through a one-half rate convolutional code so that for each bit of information, two symbols come out of the encoder. Thus, 456 symbols are interleaved and transmitted over four time slots in one embodiment. Each time slot includes 114 symbol positions in that embodiment.

The de-modulator 22 extracts the transmitted symbols. The de-interleaver 26 receives 456 symbols in one embodiment. In interleaving, symbols may be placed in a plurality of different time slots, such as four time slots. As one example, the first of 456 symbols may be placed in a first time slot, the second symbol in the second time slot, the third symbol in the third time slot, the fourth symbol in the fourth time slot, the fifth symbol in the first time slot, the sixth symbol in the second time slot, the seventh symbol in the third time slot and the eighth symbol in the fourth time slot, and so on. Thus, successive sets of four symbols are placed successively in the four time slots.

Adjacent symbols are spread across different time slots. By spreading the symbols across the time slots, it is more likely that those symbols may be recovered. The de-interleaver 26 may recover the symbols from the different time slots in the correct order. The decoder 28 then calculates the check sum and the checker 30 checks the check sum calculated by the decoder 28 to determine whether or not it is correct.

The filler unit 27 may not be used in some embodiments. Whenever symbols are missing because they could not be demodulated, a zero may be inserted by the filler unit 27 where the symbol would otherwise have been.

Figure 2:
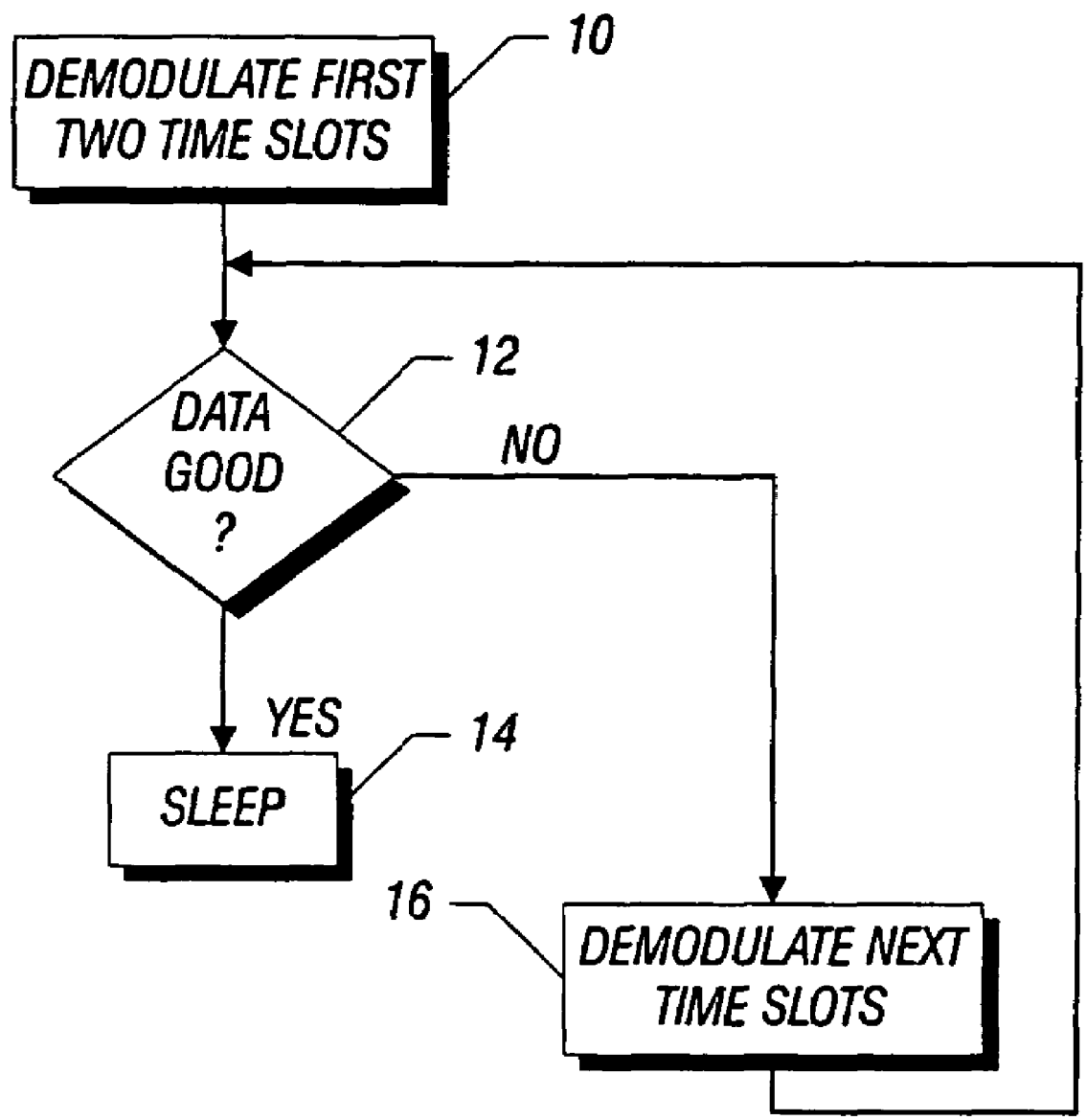
FIG. 2 is a flow chart in accordance with one embodiment of the present invention.

Referring to FIG. 2, at predetermined intervals, the receiver 20 wakes itself up. In some embodiments, the receiver 20 knows when it is going to receive a paging symbol and automatically wakes itself up in sufficient time to receive the message. For example, the network may tell the receiver 20 when the paging messages will be transmitted. The receiver 20 demodulates the symbols in the first two time slots as indicated in block 10. If the symbols are decoded and are correct, as determined in diamond 12, then the receiver 20 may go back to sleep as indicated in block 14 assuming there are no other incoming messages. If the data is not good, then the receiver may continue to demodulate the next ensuing time slot as indicated in block 16. As a result, if the message is very clear, it may not be necessary to demodulate all of the symbols in all of the time slots, reducing the amount of time involved in receiving the paging message. As a result, the amount of power consumed in the idle state may be reduced.

Figure 3:
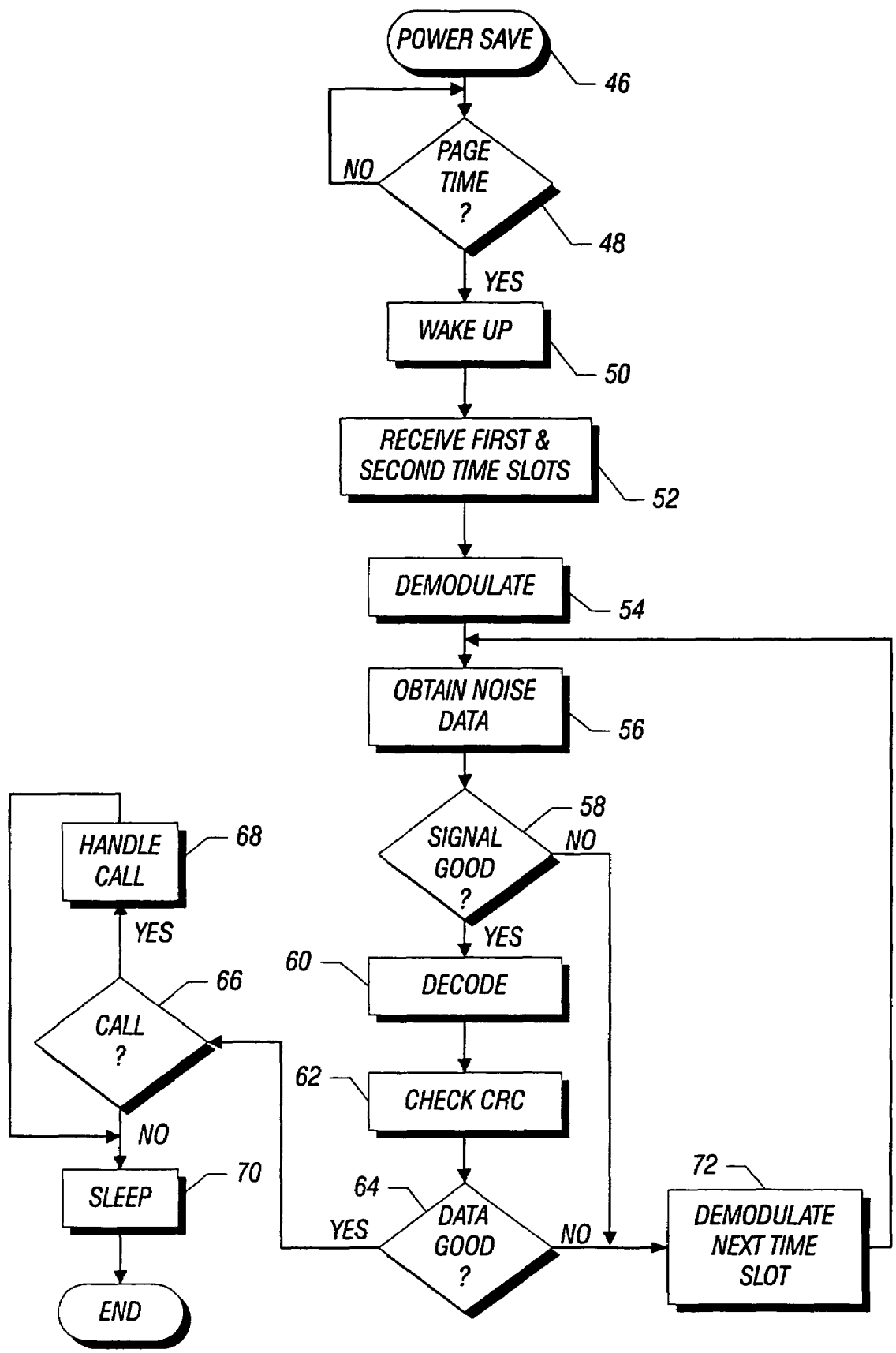
FIG. 3 is a flow chart in accordance with one embodiment of the present invention.

Turning next to FIG. 3, the power saving software 46 may be stored, for example, in association with the control circuitry 44 in one embodiment. The software 46 may begin by determining whether the paging message time has arrived as indicated in diamond 48. If so, the receiver 20 may be awakened as indicated in block 50 to receive the message. The receiver 20 may receive and demodulate the symbols of the first and second time slots as indicated in blocks 52 and 54.

In block 56, slot quality data may be obtained. In one embodiment of the present invention, the noise data may be carrier to interference ratio (CIR) data. If the signal is sufficiently low in noise, the first two time slots may be decoded as indicated in block 60. Next, an error code may be checked as indicated in block 62. If the received data is acceptable, as determined in diamond 64, a check at diamond 66 determines whether there is another incoming message such as the telephone call. If so, that call is handled as indicated in block 68. If not, the receiver 20 can return to the sleep mode as indicated in block 70 wherein power is conserved.

If at diamond 58 it is determined that the signal is too noisy, the operations of block 60 and 62 may be skipped and the flow may continue to demodulate the next time slot as indicated in block 72. In such case, it has been determined that the signal is too noisy and therefore it would be a waste of power to proceed with decoding when the odds of success are so low. As a result, power consumption may be preserved by avoiding unnecessary mathematical decoding operations.

Similarly, if, as a result of the decoding, it is determined that the data from the first and second time slots is not sufficient, the flow proceeds to demodulate an ensuing time slot. In such case, the decoding of an ensuing time slot increases the power consumption, but in such case, it is necessary to proceed in this fashion.

Figure 4:
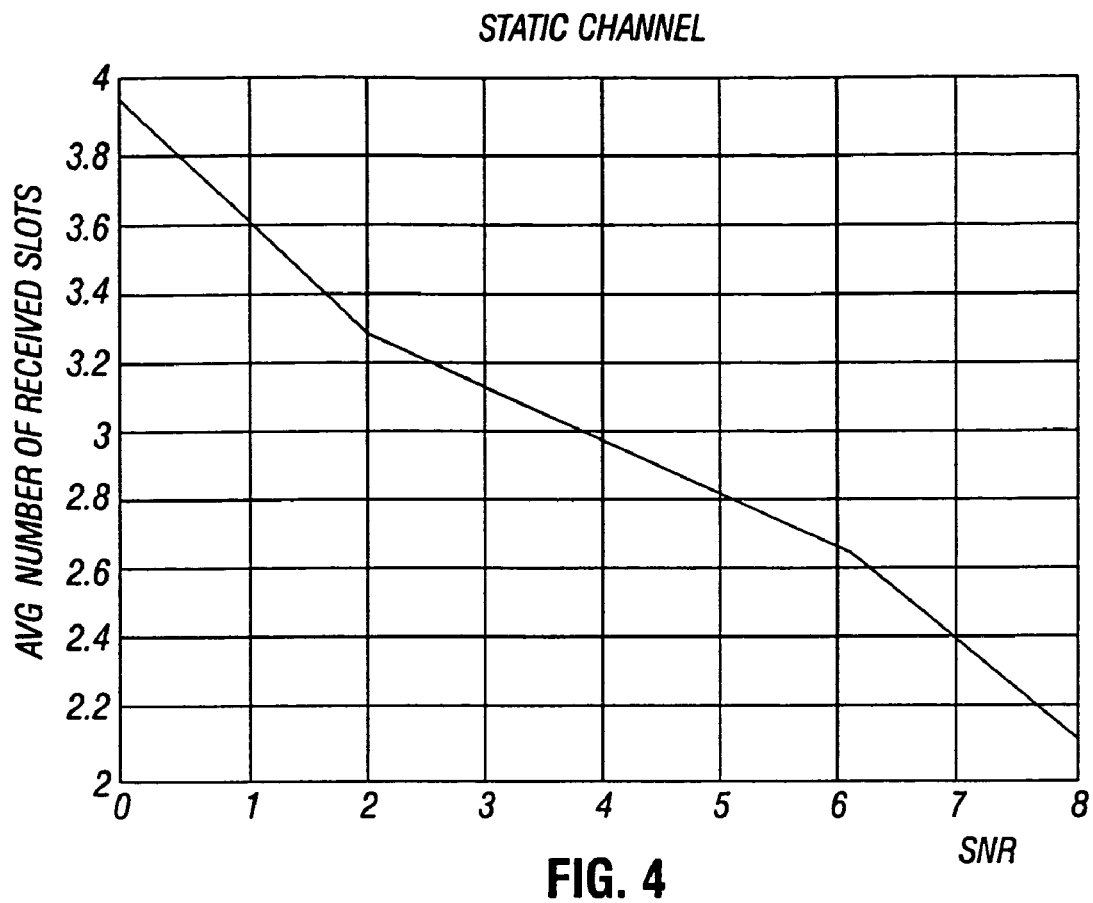
FIG. 4 is a graph of simulation results showing the average number of received slots versus the signal to noise ratio (SNR) for a static channel.
Figure 5:
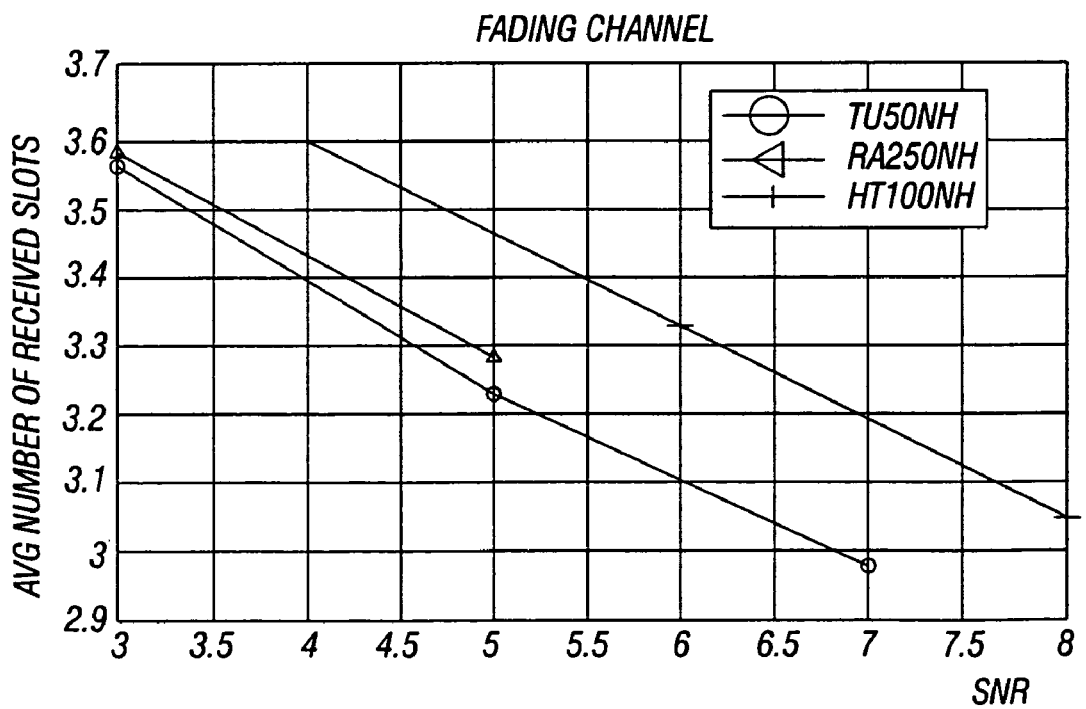
FIG. 5 is a graph of simulation results showing the average number of received slots versus the signal to noise ratio for a plurality of fading channels.

For example, as indicated in FIGS. 4 and 5, based on simulations, it appears that, in general, power can be conserved in both static channel (FIG. 4) and fading channel (FIG. 5) environments. For example, FIG. 4 shows a static channel configured according to the GSM specification. With reasonable signal to noise ratios, it is often possible to receive and demodulate less than all four available time slots. This necessarily corresponds to significantly less power consumption. Likewise in FIG. 5, with a fading channel, the average number of time slots is still significantly lower than four, indicating that at a range of signal to noise ratios, the need to demodulate all four time slots may be avoided, resulting in power savings.

In FIG. 5, a typical urban signal where the mobile is traveling at 50 miles per hour in a non-frequency hopping mode (TU50NH), a rural area mobile traveling at 250 kilometers per hour in a non-frequency hopping mode (RA250NE) and a hilly terrain mobile traveling at 100 kilometers per hour in a non-frequency hopping mode (HT100NH) are all illustrated. Thus, FIG. 5 indicates that in a variety of fading channel environments, power may be saved by using techniques in accordance with embodiments of the present invention.

While an embodiment has been described in connection with a GSM cellular telephone, those skilled in the art will appreciate that embodiments of the present invention may be applicable in a variety of communications networks including wireless and wired communication networks that use interleaving. For example, the present invention may be used with pagers, optical networks, and wireless networks including radio frequency and infrared networks, to mention a few examples.

In some embodiments of the present invention, determining whether the message was successfully decoded is performed using methods other than CRC in addition to, or instead of, using the CRC check. Such methods include, for example, other error detection codes such as parity checks and block code checks, and a comparison of the received code to a closed group of possible messages.

It is noted that in some embodiments of the present invention, the CRC is used to correct errors in addition to detecting errors. In these embodiments a decoding is treated as having failed only if the CRC was not able to correct the error. That is, if the CRC check failed but the error was corrected, the decoding is considered successful.

Although in the above description an example was given in which the decoder 28 operates on Viterbi style codes, the decoder 28 may operate in accordance with substantially any other code, such as turbo style codes, and linear and/or non linear block codes.

In one embodiment of the present invention, the method of FIG. 2 is implemented on those messages for which there is an advantage in reducing the reception time of the message. In one embodiment of the present invention, the method of FIG. 2 is performed when the receiver is in idle mode. Alternatively or additionally, the method of FIG. 2 is implemented on messages where there is a substantial probability that the receiver 20 should go to sleep. Additionally, the method of FIG. 2 may be implemented on messages in which there is a substantial probability that the receiver will go to sleep after receiving the message even if the message does not relate to the operation of the receiver 20.

In one embodiment of the present invention, the receiver 20 is a part of a cellular phone. In this embodiment, the method of FIG. 2 may be implemented on the messages received on a paging channel. Alternatively, the method of FIG. 2 may be implemented on all the non-audio messages.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method for controlling a receiver, comprising:
    awakening the receiver to receive a paging message that is defined by transmitted symbols that are transmitted in a plurality of separate time slots;
    demodulating at least a portion of the received symbols;
    estimating the paging message using a part of the demodulated symbols that is less than all of the symbols defining the paging message;
    assessing a correctness of the estimated paging message; and
    if the paging message meets or exceeds a correctness requirement, returning the receiver to a sleep mode based on the paging message having been estimated using fewer demodulated-symbols than all of the symbols defining the paging message.

2. The method of claim 1, wherein estimating the paging message comprises decoding the paging message.

3. The method of claim 1, further comprising:
    obtaining noise data after demodulating the portion of the symbols and assessing a signal quality of the paging message.

4. The method of claim 3, the step of demodulating further comprising:
    determining whether to decode an initial portion of the paging message based on the signal quality of the paging message.

5. The method of claim 3, the step of demodulating further comprising:
    demodulating symbols in a first pair of time slots;
    obtaining noise data; and
    determining, based on the noise data, whether to demodulate symbols in an additional time slot.

6. The method of claim 1, further comprising:
    demodulating symbols in a first pair of time slots;
    determining whether additional information is needed; and
    if additional information is needed, demodulating symbols in a third time slot.

7. An article comprising a computer-readable medium storing instructions that enable a processor-based system to:
    awaken a receiver to receive a paging message that is defined by transmitted symbols that are transmitted in a plurality of separate time slots;
    demodulate at least a portion of the received symbols;
    estimate the paging message using a part of the demodulated symbols that is less than all of the symbols defining the paging message;
    assess a correctness of the estimated paging message; and
    if the paging message meets or exceeds a correctness requirement, return the receiver to a sleep mode based on the paging message having been estimated using fewer demodulated-symbols than all of the symbols defining the paging message.

8. The article of claim 7, further storing instructions that enable a processor-based system to:
    estimate the paging message by decoding the paging message.

9. The article of claim 7, further storing instructions that enable a processor-based system to:
    obtain noise data after demodulating the portion of the symbols and assessing a signal quality of the paging message.

10. The article of claim 9, further storing instructions that enable a processor-based system to:
    determine whether to decode an initial portion of the paging message based on the signal quality of the paging message.

11. The article of claim 9, further storing instructions that enable a processor-based system to:
    demodulate symbols in a first pair of time slots;
    obtain noise data; and
    determine, based on the noise data, whether to demodulate symbols in an additional time slot.

12. The method of claim 7, further storing instructions that enable a processor-based system to:
    demodulate symbols in a first pair of time slots;
    determine whether additional information is needed; and
    if additional information is needed, demodulate symbols in a third time slot.

13. A communication terminal, comprising:
    a demodulator configured to receive a paging message that is defined by transmitted symbols that are transmitted in a plurality of separate time slots, and demodulate at least a portion of the received symbols;
    an estimator configured to estimate the paging message using a part of the demodulated symbols that is less than all of the symbols defining the paging message; and
    control circuitry configured to determine if the paging message meets or exceeds a correctness requirement, and if so, return the receiver to a sleep mode based on the paging message having been estimated using fewer demodulated-symbols than all of the symbols defining the paging message.

14. The communication terminal of claim 13, wherein the estimator is a decoder that is configured to decode the paging message using a part of the demodulated symbols that is less than all of the symbols defining the paging message.

15. The communication terminal of claim 13, wherein the communication terminal is a cell phone.

16. The communication terminal of claim 15, wherein the cell phone is capable of using GSM.

17. The communication terminal of claim 13, wherein the control circuitry is further configured to:
   obtain noise data from the demodulator after the demodulator demodulates the portion of the symbols; and
   assess a signal quality of the paging message based on the noise data.

18. The communication terminal of claim 17, wherein the control circuitry is further configured to:
   determine whether to decode an initial portion of the paging message based on the signal quality of the paging message.

19. The communication terminal of claim 17, wherein the demodulator is configured to demodulate symbols in a first pair of time slots; and
   the control circuitry is configured to;
   obtain noise data from the demodulator; and
   determine, based on the noise data, whether to instruct the demodulator to demodulate symbols in an additional time slot.

20. The communication terminal of claim 13, wherein the demodulator is configured to demodulate symbols in a first pair of time slots; and
   the control circuitry is configured to:
   determine whether additional information is needed; and
   if additional information is needed, instruct the demodulator to demodulate symbols in a third time slot.

* * * * *

UNITED STATES PATENT AND TRADEMARK OFFICE
CERTIFICATE OF CORRECTION

PATENT NO. : 7,646,748 B2
APPLICATION NO. : 12/010624
DATED : January 12, 2010
INVENTOR(S) : Paul S. Spencer et al.

It is certified that error appears in the above-identified patent and that said Letters Patent is hereby corrected as shown below:

On the Title page:

(75) Inventors: Paul S. Spencer, Bet Shemesh (IL);
Ronen Mayrench, Raanana (IL);
Doron Rainish, ~~Raanana~~Ramat Gan (IL)

Signed and Sealed this
Twenty-eighth Day of December, 2010

David J. Kappos
*Director of the United States Patent and Trademark Office*